United States Patent [19]

Peleg

[11] Patent Number: 5,126,519
[45] Date of Patent: Jun. 30, 1992

[54] METHOD AND APPARATUS FOR PRODUCING MICROWAVE SUSCEPTOR SHEET MATERIAL

[75] Inventor: Yigal Peleg, Solon, Ohio

[73] Assignee: The Stouffer Corporation, Solon, Ohio

[21] Appl. No.: 465,336

[22] Filed: Jan. 16, 1990

[51] Int. Cl.$^5$ ............................................. B23K 15/10
[52] U.S. Cl. ...................... 219/10.55 E; 219/10.55 D; 219/10.55 F; 219/10.55 M; 99/DIG. 14; 428/328; 428/480; 428/483
[58] Field of Search ................ 219/10.55 E, 10.55 D, 219/10.55 F, 10.55 M, 10.53, 9.5, 10.493; 99/DIG. 14; 428/328, 480, 483, 458, 475.2, 447

[56] References Cited

U.S. PATENT DOCUMENTS

| | | | |
|---|---|---|---|
| 4,230,924 | 10/1980 | Brastad et al. | 219/10.55 |
| 4,258,086 | 3/1981 | Beall | 219/10.43 |
| 4,267,420 | 5/1981 | Brastad | 219/10.55 |
| 4,310,584 | 1/1982 | Cooper et al. | 428/212 |
| 4,641,005 | 2/1987 | Seiferth | 219/10.55 |
| 4,703,148 | 10/1987 | Mitkulski et al. | 219/10.55 E |
| 4,713,510 | 12/1987 | Quick et al. | 219/10.55 |
| 4,825,025 | 4/1989 | Seiferth | 219/10.55 |
| 4,851,632 | 7/1989 | Kaliski | 219/10.55 E |
| 4,911,938 | 3/1990 | Fisher et al. | 426/107 |
| 4,933,193 | 6/1990 | Fisher | 426/107 |
| 4,946,743 | 8/1990 | Winter | 428/249 |
| 5,021,293 | 6/1991 | Huang et al. | 428/328 |

*Primary Examiner*—Bruce A. Reynolds
*Assistant Examiner*—Tu Hoang
*Attorney, Agent, or Firm*—Body, Vickers & Daniels

[57] ABSTRACT

Microwave susceptor sheet of the paperboard type, and method of making such susceptor sheet for use in a disposable food appliance adapted to heat a quantity of food in the appliance by microwave energy which susceptor sheet and method comprises vacuum deposition of a layer of aluminum onto a thin plastic film and then bonding the film onto a support sheet of paperboard, wherein the thin plastic film has a thickness of less than about 1.0 mil and is formed from PCTA copolyester plastic having a melting point of greater than 500° F.

15 Claims, No Drawings

METHOD AND APPARATUS FOR PRODUCING MICROWAVE SUSCEPTOR SHEET MATERIAL

DISCLOSURE

The present invention relates to the art of disposable containers for microwave reconstitution of food items and more particularly to a novel laminated susceptor sheet material and method of making this material for use in microwave heating of food items.

INCORPORATION BY REFERENCE

Many patents have issued which relate to the concept of depositing a thin metallized layer onto a plastic film which is, in turn, mounted on a paperboard for the purposes of forming a microwaveable susceptor sheet capable of converting microwave energy into heat as the microwaves pass through the sheet. These microwave susceptor sheets are laminated stock and are disclosed in prior U.S. patents, such as Seiferth U.S. Pat. No. 4,825,025, Sieferth U.S. Pat. No. 4,641,005, Quick U.S. Pat. No. 4,713,510, Brastad U.S. Pat. No. 4,267,420, Beall U.S. Pat. No. 4,258,086 and Brastad U.S. Pat. No. 4,230,924. All of these patents are incorporated by reference herein as background information and to prevent the necessity for duplicating the material of these patents into this disclosure.

BACKGROUND OF INVENTION

During the last few years, a substantial effort has been devoted to production of thin paperboard laminated sheet material incorporating a food engaging plastic film having a vacuum deposition layer of metal, such as elemental aluminum, which metallized layer forms a microwave interactive layer. This sheet stock is referred to as a susceptor and is produced in large quantities for the food industry. When the susceptor sheet material is wrapped around a food item, such as a pizza, or is formed into a container for encircling a food item, microwave energy can penetrate the metallized layer of the susceptor sheet material causing eddy current to flow in the metallized layer to increase the temperature of the metallized layer and, thus, the lamination sheet material itself. Consequently, the lamination sheet material is a heat source for cooking food items adjacent the susceptor material or within a container formed by the susceptor material. The susceptor material has the characteristics of a thin paperboard and can be die cut, formed and glued into various shapes. This sheet material is widely employed in the food industry and is primarily applicable to heating of crust type food items, such as the crust of a pizza or the crust of a pot pie.

By allowing the susceptor sheet material to be an independent heat source activated by microwave energy, the susceptor sheet material can obtain a relatively high temperature such as over 400° F. which will heat the adjacent food item either by radiation or contact conduction. In this latter instance, with the temperature of the susceptor sheet increasing to a temperature substantially higher than the temperature possible by microwave heating of the food item directly, the susceptor sheet can cause crisping and browning of the crust of the food item. Consequently, one of the primary objectives of a microwave susceptor sheet stock is the ability to reach a relatively high temperature, which is a function of the amount of vacuum deposited aluminum forming the microwave interactive layer and the applied microwave energy. As the metal applied to the plastic film of the metallized surface increases, the obtainable temperature of the susceptor sheet will first rise and then drastically decrease. This decrease is caused by a complete covering of the plastic film. If the metallized aluminum layer is a continuous layer of aluminum, microwave energy will be reflected from the layer and will create a minor amount of eddy current heating in the metallized layer. Thus, the metallized aluminum must have a relatively thin thickness allowing passage of microwave energy to create heating of the interactive metal layer.

The thickness of the metallized layer controls the ultimate temperture reached during exposure of the susceptor sheet to microwave energy. Since the aluminum is vacuum deposited upon a thin film of plastic material, the temperature to which the interactive aluminum layer can increase is limited by the thermal characteristics of the thin plastic film onto which the interactive metallized layer is vacuum deposited. To obtain the necessary temperature for rapid and effective crisping and browning of crust material, polyethylene film has generally been replaced by polyester film. In addition, the thickness of the plastic film is generally greater than 1.0 mils to withstand the temperature to which the interactive layer is elevated during the cooking process. It has been found that even with a relatively thick layer (5 mils) of PET (polyethylene terephthalate) the temperature to which the interactive layer could be elevated during the cooking process was seriously limited. When using the more standard PET material, which is readily available in thin film, a sufficient amount of deposited aluminum on the PET film to create the desired cooking temperature caused crazing of the film during the cooking process. The temperature of the sheet would exceed 400° F. and the PET would craze at about 400° F. To prevent such crazing, the temperature of the interactive material was reduced by limiting the amount of metallization on the surface of the film. This, in turn, reduces the effectiveness of the susceptor sheet material for heating the food adjacent the susceptor sheet.

In view of this situation, there has been a substantial demand for a thin film material which would not craze at temperatures desired for effective cooking of food by the lamination microwave susceptor sheet material. It was suggested that laminated high temperature plastic material could be used for supporting the metallized microwave interactive layer. Higher temperature plastic materials were not available in thin film. Less than 5 mils is an acceptable film thickness for the purposes of use in a microwave susceptor sheet of the type including a thin plastic film which is metallized and supported on a paperboard. Further, even at the high range of acceptable thickness, high temperature plastic was too expensive for susceptor sheet.

Efforts to increase the thickness of the plastic film for the purposes of withstanding higher temperatures has proven ineffective. The increased thickness resulted in an insulation layer between the interactive metallized layer and the food being cooked. In Quick U.S. Pat. No. 4,713,510 the crazing problem was solved by placing the food against the paperboard instead of against the plastic film. Thus, crazing of the film which supported the metallized microwaveable interactive material was irrelevant. This solution was not effective because this paperboard created even a greater insulation barrier between the interactive layer and the food item being cooked by the microwave energy.

In accordance with the present invention, PCTA copolyester plastic film sold by Eastman Chemical Products a subsidiary of Eastman Kodak Company under the No. 6761 has proven extremely advantageous. This material has a melting point of 545° F. with an inherent viscosity 0.96. The crystalline peak melting point is 545° F. The temperature of crystallization on cooling is 375° F. Glass transition temperature is 208° F. This material is sold under the trademark THERMX and is not available in thin film. In accordance with the present invention, this plastic material is to be extruded into a sheet having a thickness of less than 1.0 mils. Directly onto this material vacuum deposited aluminum is to be added with a metallization thickness sufficient to raise the temperature above over 400° F., and preferably over 450° F. PCTA copolyester is a polymer of cyclohexanedimethanol and terephthalic acid with another acid substituted for a portion of the terephthalic acid.

In accordance with the present invention, there is provided a laminated susceptor sheet for use in a disposable container adapted to heat a quantity of food in the container when exposed to microwave energy. The lamination comprises a microwave interactive layer of electrically conductive metal having a thickness which is sufficiently small to cause the microwave interactive layer, when subjected to microwave energy, to heat up to a temperature of over 400° F., which temperature is sufficient to heat the surface of the food in heat transfer relationship with the susceptor material. Of course, between the interactive layer and the food there is provided a protective thin plastic film having sufficient stability at high temperature that it will not degrade when the lamination is subjected to microwave energy to heat the surface of the quantity of food. In accordance with the present invention, the protective plastic film onto which the interactive layer of electrically connective metal is deposited, is PCTA copolyester film having a thickness of less than about 1.0 mil with a melting point of over 500° F. The protective plastic film with the interactive layer of electrically conductive metal is supported onto a paper stock material having a sufficient structural stability at high temperature necessary for heating the surface of the quantity of food to maintain its physical shape at such high temperatures. The interactive metallized layer of conductive metal is formed onto the plastic film in accordance with standard practice of vacuum depositing the microwaveable interactive layer onto the plastic film after which the film is bonded directly to the paper stock material in a manner to cause the film and interactive layer to be held in bonded relationship with the paper stock.

In accordance with another aspect of the invention, there is provided a method of making a laminated susceptor sheet for use in a disposable container adapted to heat a quantity of food. This method includes extruding a thin plastic film of less than about 1.0 mils from PCTA copolyester plastic, vacuum depositing a layer of elemental aluminum onto the plastic film with aluminum having a thickness which is sufficiently small to cause the aluminum layer, when subjected to microwave energy, to heat to the desired temperature of over 400° F. and bonding the plastic film directly onto one side of a paperboard stock material.

The primary object of the present invention is the provision of a unique microwave susceptor sheet formed by laminating a thin plastic film, onto which there is deposited a metallized layer, onto a paperboard sheet, which susceptor sheet does not craze at high temperatures and can be heated to a temperature exceeding about 450° F. without crazing or degrading of the plastic film against which the food being cooked is placed.

Another object of the present invention is the provision of a heat susceptor sheet, as defined above, which sheet is relatively inexpensive to manufacture, can be employed for browing and crisping crust material at relatively high temperatures and can employ normal microwave susceptor technology.

These and other objects and advantages will become apparent from the description of the preferred embodiment.

PREFERRED EMBODIMENT

A film having a thickness of less than about 1.0 mils and preferably between 0.5 and 0.1 mils is extruded from PCTA copolyester 6761 material sold by Eastman Chemical Products and is stored on a supply roll. This roll of thin film is fed through a vacuum deposition chamber where elemental aluminum is deposited along one surface of the thin metal film to a metallized thickness needed to create the desired heating effect which is substantially greater than the thickness normally applied to PET plastic (i.e. surface resistivity of 0.40-8 ohms per inch) so that the temperature at which the interactive layer will be heated by a given microwave energy will be substantially greater than the temperature that would cause crazing of PET which is approximately 400° F. After the metallized surface has been applied onto the thin (i.e. 0.1-1.0 mils) PCTA film, the thin film is bonded to a paperboard with the metallized surface encapsulated between the plastic protective film and the paperboard. This susceptor sheet is then employed for a container or for a heating surface within a microwave heating utensil or container. The term "container" is intended to be generic for both a surface heating application of the present invention and the concept of surrounding the food being heated.

In the past, the protective film was often greater than 1.0 mil. Indeed, increasing the film thickness was employed for preventing the crazing which has been eliminated by implementation of the present invention.

Although PCTA film has been available, it was used in thickness greater than 1.0 mils. This film has been used only for laminated high temperature heating utensils and then only occasionally. Basically PCTA has had limited applications. It is novel to extrude PCTA copolyester into the thin film of less than about 1.0 mils and then use this thin film for the food engaging protective means in a lamination to be used as a microwave susceptor sheet. In the past, the protective sheet means for use in susceptor sheets have been selected based upon a compromise between cost and heat resistibility. The present invention relates to the concept of employing a high temperature plastic material in thin film, which has not heretofore been available in thin film and which surprisingly reduces the tendency of crazing at temperatures of over 450° F. that has plagued the paperboard type heat susceptor art for many years.

Having thus described the invention, the following is claimed:

1. A paperboard type microwave susceptor sheet material formed by a laminating process for use in a disposable food appliance package adapted to heat a surface of food associated with said food appliance package when said food appliance package is exposed to microwave energy, said susceptor sheet material comprising:
  (a) a microwave interactive layer of electrically conductive metal having a thickness which causes said microwave interactive layer to be heated when subjected to microwave energy, said microwave interactive layer heats said surface of said food in heat transfer relationship therewith;
  (b) protective means for said microwave interactive layer, said protective means including smooth surfaced thin plastic film with an extruded thickness of less than or equal to 1.0 mil so that at high temperature it will remain stable and not degrade when the susceptor sheet material is subjected to microwave energy to heat said surface of said food, said plastic film being PCTA copolyester with a melting point of over 500° F.; and,
  (c) support means for providing structural support for said interactive layer and said plastic film, said support means being formed of thin paper stock material having structural stability while heating said surface of said food to maintain its physical shape; wherein said susceptor sheet material is formed by said laminating process including the steps of vacuum depositing said microwave interactive layer onto smooth surfaced thin plastic film followed by bonding directly said thin plastic film upon which said microwave interactive layer has been vacuum deposited to one side of said paper stock material in a manner to cause said thin plastic film and said microwave interactive layer to be held in bonded relationship with said support means.

2. A susceptor sheet material according to claim 1, wherein a surface of said thin plastic film upon which said interactive layer of electrically conductive metal has been vacuum deposited is bonded directly to said paper stock material.

3. A susceptor sheet material according to claim 1, wherein said thin plastic film is adapted to directly contact the surface of food.

4. A susceptor sheet material according to claim 1, wherein said microwave interactive layer of electrically conductive metal is vacuum vapor deposited onto said thin plastic film.

5. A food appliance package including said susceptor sheet material according to claim 1, wherein said food appliance package includes means for partially encompassing food to be surface heated by said susceptor sheet when exposed to microwave energy.

6. A susceptor sheet material according to claim 1 wherein said extruded thickness of said thin plastic film is the range of 1.0–0.1 mil.

7. A susceptor sheet material according to claim 1 wherein said extruded thickness of said thin plastic film is in the range of 0.5–0.1 mil.

8. A susceptor sheet material according to claim 1 wherein said thickness of said electrically conductive metal of said microwave interactive layer causes said interactive layer of electrically conductive metal to be heated above 400° F. when said microwave interactive layer is subjected to microwave energy.

9. A susceptor sheet material as defined in claim 1 wherein said interactive layer is vacuum deposited elemental aluminum.

10. A food appliance package including said susceptor sheet material according to claim 1, wherein said food appliance package includes means for encompassing food to be surface heated by said susceptor sheet when exposed to microwave energy.

11. A susceptor sheet material according to claim 1 wherein said thickness of said electrically conductive metal of said microwave interactive layer causes said interactive layer to be heated above 450° F. when said microwave interactive layer is subjected to microwave energy.

12. A paperboard type microwave susceptor sheet material for use in a disposable food appliance package adapted to heat a surface of food associated with said appliance package when said appliance package is exposed to microwave energy, said susceptor sheet material comprising:
  (a) a microwave interactive layer of electrically conductive metal having a thickness which causes said microwave interactive layer, when subjected to microwave energy, to heat up to a temperature above 400° F. for heating said surface of said food in heat transfer relationship therewith;
  (b) protective means for said microwave interactive layer, said protective means including a smooth surfaced thin plastic film with an extruded thickness in the range of 1.0–0.1 mil, said thin plastic film being stable and not crazed or degraded at a high temperature when said susceptor sheet material is heated to a temperature above 400° F. by being subjected to microwave energy for heating said surface of said food, said plastic being a copolyester with a melting point of over 500° F.; and
  (c) support means for providing structural support for said interactive layer and said plastic film, said support means being formed of thin paper stock material having structural stability to maintain its physical shape at temperatures above 400° F. while heating said surface of said food.

13. A susceptor sheet material according to claim 12 wherein said microwave interactive layer of electrically conductive metal is vacuum deposited on said smooth surfaced thin plastic film.

14. A susceptor sheet material according to claim 13 wherein, a surface of said thin plastic film upon which said interactive layer has been vacuum deposited is bonded directly to said paper stock material.

15. A susceptor sheet material according to claim 12 wherein said thickness of said electrically conductive metal of said microwave interactive layer causes said microwave interactive layer to be heated above 450° F. when said interactive layer is subjected to microwave energy, said thin plastic film remains stable and not crazed or degraded when heated to a temperature above 450° F. and said paper stock material has structural stability to maintain its physical shape above 450° F.

* * * * *